United States Patent
Watanabe et al.

(10) Patent No.: US 9,637,413 B2
(45) Date of Patent: May 2, 2017

(54) DISK ROLL AND SUBSTRATE THEREFOR

(71) Applicant: NICHIAS CORPORATION, Tokyo (JP)

(72) Inventors: Kazuhisa Watanabe, Tokyo (JP); Tetsuya Mihara, Tokyo (JP); Taichi Shiratori, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 14/421,221

(22) PCT Filed: Aug. 7, 2013

(86) PCT No.: PCT/JP2013/004769
§ 371 (c)(1),
(2) Date: Feb. 12, 2015

(87) PCT Pub. No.: WO2014/027451
PCT Pub. Date: Feb. 20, 2014

(65) Prior Publication Data
US 2015/0203410 A1    Jul. 23, 2015

(30) Foreign Application Priority Data
Aug. 13, 2012    (JP) ................ 2012-179248

(51) Int. Cl.
*B25F 5/02*    (2006.01)
*C04B 33/36*    (2006.01)
(Continued)

(52) U.S. Cl.
CPC .............. *C04B 33/36* (2013.01); *B23P 19/00* (2013.01); *B28B 1/52* (2013.01); *B28B 3/126* (2013.01); *C03B 13/16* (2013.01); *C03B 17/061* (2013.01); *C03B 17/068* (2013.01); *C03B 35/181* (2013.01); *C03B 35/189* (2013.01); *C04B 33/04* (2013.01); *C04B 33/13* (2013.01);
(Continued)

(58) Field of Classification Search
CPC  F16C 13/00; B41N 7/06; B21B 27/00; C04B 41/009; B32B 15/011
USPC ...... 492/40, 53, 59; 428/688, 689, 699, 702; 65/374.13
See application file for complete search history.

(56) References Cited

U.S. PATENT DOCUMENTS 4,533,581 A    8/1985  Asaumi et al.
5,989,170 A   11/1999  Hart et al.
(Continued)

FOREIGN PATENT DOCUMENTS

EP    1795505 A1    6/2007
JP    2004-299980 A    10/2004
(Continued)

OTHER PUBLICATIONS

International Search Report issued in corresponding application PCT/JP2013/004769, completed Nov. 5, 2013 and mailed Nov. 12, 2013.
(Continued)

*Primary Examiner* — Noah Wiese
(74) *Attorney, Agent, or Firm* — Griffin and Szipl PC

(57) ABSTRACT

A base material for a disk roll, the base material including: 5 to 9 wt % of ceramic fibers, 20 to 40 wt % of kibushi clay, 2 to 20 wt % of bentonite and 40 to 60 wt % of mica.

18 Claims, 1 Drawing Sheet

(51) Int. Cl.
*B28B 1/52* (2006.01)
*C04B 33/13* (2006.01)
*B28B 3/12* (2006.01)
*C04B 33/04* (2006.01)
*C03B 13/16* (2006.01)
*C04B 35/80* (2006.01)
*C03B 17/06* (2006.01)
*B23P 19/00* (2006.01)
*C04B 35/18* (2006.01)
*C03B 35/18* (2006.01)

(52) U.S. Cl.
CPC ............ *C04B 35/18* (2013.01); *C04B 35/803* (2013.01); *C04B 2235/349* (2013.01); *C04B 2235/3472* (2013.01); *C04B 2235/3481* (2013.01); *C04B 2235/5228* (2013.01); *C04B 2235/94* (2013.01); *C04B 2235/9615* (2013.01); *Y10T 29/49826* (2015.01)

(56) References Cited

U.S. PATENT DOCUMENTS

| | | |
|---|---|---|
| 2003/0181302 A1 | 9/2003 | Kaiser et al. |
| 2004/0220032 A1 | 11/2004 | Nakayama et al. |
| 2005/0212158 A1 | 9/2005 | Kaiser |
| 2008/0120995 A1 | 5/2008 | Neubauer et al. |
| 2009/0149310 A1 | 6/2009 | Neubauer et al. |
| 2009/0272151 A1 | 11/2009 | Lacasse et al. |
| 2010/0064729 A1* | 3/2010 | Nakayama ............ C03B 13/16 65/90 |
| 2011/0023547 A1 | 2/2011 | Neubauer et al. |
| 2011/0287915 A1* | 11/2011 | Horiuchi ................ C03B 13/16 492/40 |
| 2014/0116093 A1 | 5/2014 | Nakayama et al. |
| 2014/0283556 A1 | 9/2014 | Nakayama et al. |

FOREIGN PATENT DOCUMENTS

| | | |
|---|---|---|
| JP | 2009-132619 A1 | 6/2009 |
| JP | 2010-510956 A1 | 4/2010 |
| JP | 2011-519337 A | 7/2011 |
| WO | 2006/025402 A1 | 3/2006 |
| WO | 2012/070650 A1 | 5/2012 |

OTHER PUBLICATIONS

English translation of the International Preliminary Report on Patentability issued in corresponding application PCT/JP2013/004769 issued on Feb. 17, 2015.

Office Action mailed Nov. 12, 2015 in corresponding Chinese application 201380043165.0.

* cited by examiner

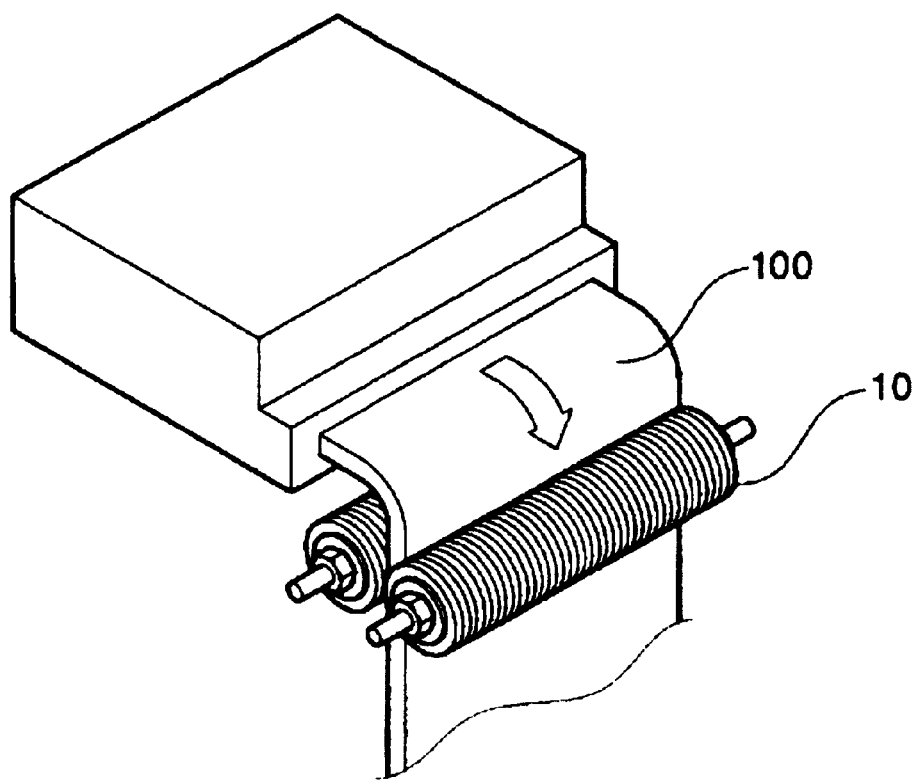

DISK ROLL AND SUBSTRATE THEREFOR

This is a National Phase Application in the United States of International Patent Application No. PCT/JP2013/004769 filed Aug. 7, 2013, which claims priority on Japanese Patent Application No. 2012-179248, filed Aug. 13, 2012. The entire disclosures of the above patent applications are hereby incorporated by reference.

TECHNICAL FIELD

The invention relates to a disk roll suited for the production of plate glass, and a base material therefor.

BACKGROUND ART

Plate glass is produced by continuously supplying to an apparatus a glass melt, allowing the glass melt to be flown down from the apparatus in the form of a belt, and curing by cooling during the flowing. A disk roll acts as a pair of tensile rolls and is used to dispose therebetween the belt-like glass melt and forcedly send it downward. In addition to the above-mentioned down-draw method, the plate-shaped glass can be produced by the float method, the roll-out method, the Colburn method, or the like.

In general, a disk roll is obtained by fitting by insertion to a shaft (served as a rotation shaft) a plurality of disk materials obtained by punching a mill board (plate-like molded product, base material) in the form of a ring to obtain a roll-like laminate, and applying a pressure to the entire laminate through a flange provided at both ends. The outer peripheral surface of the disk material functions as the conveying surface of a glass melt.

Since a disk roll conveys a belt-like glass melt, it is not only required to have heat resistance, flexibility and hardness, but also required to prevent the glass surface from getting scratched. Disk rolls containing heat-resistant inorganic fibers, mica and clay are known (Patent Documents 1 to 3).

RELATED ART DOCUMENT

Patent Documents

Patent Document 1: JP-T-2010-510956
Patent Document 2: JP-A-2009-132619
Patent Document 3: JP-A-2004-299980

SUMMARY OF THE INVENTION

However, inorganic fibers used as raw materials are required to have high heat resistance or strength. Therefore, they are expensive. Further, since a disk roll is produced from an aqueous slurry by water filtering, a shorter water filtering time has been required in order to produce efficiently.

An object of the invention is to provide an inexpensive disk roll that is suited for the production of glass and can be produced at a low cost, as well as a base material therefor.

The inventors made intensive studies, and as a result, have found a disk roll that has a specific composition and is suited for the production of plate glass with a reduced amount of expensive heat-resistant inorganic fibers. The invention has been attained based on this finding.

According to the invention, the following base material for a disk roll or the like are provided.

1. A base material for a disk roll, the base material comprising:
   5 to 9 wt % of ceramic fibers, 20 to 40 wt % of kibushi clay, 2 to 20 wt % of bentonite and 40 to 60 wt % of mica.
2. The base material for a disk roll according to 1, wherein the ceramic fibers comprise 30 wt % or more and less than 70 wt % of alumina and more than 30 wt % and 70 wt % or less of silica.
3. The base material for a disk roll according to 1 or 2, wherein the amount of shots in the ceramic fibers is 5 wt % or less.
4. The base material for a disk roll according to any of 1 to 3, which further comprises pulp and starch.
5. A method for producing a base material for a disk roll, the method comprising:
   desulfurizing crude fibers that comprise 30 wt % or more and less than 70 wt % of alumina and more than 30 wt % and 70 wt % or less of silica to produce ceramic fibers comprising 5 wt % or less of shots;
   mixing water, the ceramic fibers, kibushi clay, bentonite and mica to produce an aqueous slurry; and
   flowing the aqueous slurry in a forming chamber or a forming mold, followed by water filtration to produce a sheet.
6. A disk roll which comprises ring-like disk materials obtained from the base material according to any of 1 to 4.
7. A method for producing a disk roll, the method comprising:
   punching out a plurality of ring-like disk materials from the base material according to any of 1 to 4; and
   fitting by insertion the plurality of ring-like disk materials into a shaft, followed by compression to obtain a roll-like laminate.
8. A method for producing glass comprising conveying a glass melt by means of the disk roll according to 6, and cooling the glass melt.

According to the invention, it is possible to provide an inexpensive disk roll that is suited for the production of glass and can be produced efficiently, as well as a base material therefor.

BRIEF DESCRIPTION OF THE DRAWINGS

FIG. 1 is a view showing one example of a method for producing glass by using a disk roll.

MODE FOR CARRYING OUT THE INVENTION

The base material for a disk roll of the invention comprises ceramic fibers (alumina silicate fibers, or the like), kibushi clay, bentonite and mica.

The ceramic fibers are contained in an amount of 5 to 9 wt %, preferably 6 to 9 wt %, more preferably 7 to 8 wt %. If the amount of ceramic fibers is less than 5 wt %, heat resistance is lowered when the base material is molded into a disk roll. If the amount of ceramic fibers exceeds 9 wt %, the density of a disk material before packing is lowered. Therefore, when adjusting to a specific packing density, the volume of a disk material is increased, whereby workability at the time of packing is lowered. In addition, if the amount of ceramic fibers is large, the cost is increased.

The ceramic fibers used in the invention normally comprise 30 wt % or more and less than 70 wt %, preferably 40 wt % or more and less than 60 wt %, more preferably 45 wt % or more and less than 55 wt % of alumina. Further, the ceramic fibers normally comprise more than 30 wt % and 70 wt % or less, preferably more than 40 wt % and 60 wt % or less, and more preferably more than 45 wt % and 55 wt % or less of silica. Fibers may be used singly or in a mixture of two or more types.

The ceramic fibers used in the invention contain shots (non-fibrous parts) having a diameter of 45 μm or more preferably in an amount of 5 wt % or less, more preferably only 2 wt % or less. A disk roll produced by using fibers that contain a large amount of shots may cause the surface of glass to be scratched. The size of shots is normally about 45 to 5000 μm. The amount of shots can be decreased by desulfurizing ceramic fibers as raw materials by a dry or wet method.

The fiber diameter of ceramic fibers is normally about 2 to 5 μm.

The base material comprises kibushi clay in an amount of 20 to 40 wt %, preferably 25 to 40 wt %, and more preferably 28 to 38 wt %. Due to the presence of kibushi clay in this range, surface lubricity (smoothness) will be improved.

Bentonite is contained in an amount of 2 to 20 wt %, preferably 2 to 15 wt %, more preferably 3 to 15 wt %, and further preferably 5 to 14 wt %. If bentonite is not contained, water filterability may be poor due to insufficient fixation and agglomeration. On the other hand, if the amount of bentonite is too large, viscosity of a slurry is increased, leading to poor water filterability.

Mica is added in order to increase the followingness of a disk material to thermal expansion of the shaft. Since the shaft to which a disk material is fitted by insertion is made of a metal, when exposed to high temperatures, this shaft is thermally expanded and extended in the axial direction. At this time, due to a low thermal expansion as compared with that of a metal, the disk material cannot follow the extension of the shaft, resulting in peeling of disk materials. On the other hand, mica has a significantly thin layer structure. Therefore, when heated, mica undergoes crystal modification. At this time, mica tends to expand in the direction of a layer. Due to such expansion in the layer direction, followingness of a disk material to thermal expansion of the shaft is increased.

As mica, white mica (muscovite; $K_2Al_4(Si_3Al)_2O_{20}(OH)_4$), black mica, gold mica (phlogopite; $K_2Mg_6(SiAl)_2O_{20}(OH)_4$), paragonite, lepidolite, synthetic fluorine mica or the like can be used. In respect of the above-mentioned followingness, white mica is preferable.

The base material comprises mica in an amount of 40 to 60 wt %, preferably 44 to 54 wt %. If the amount of mica is less than 40 wt %, the followingness of a disk material to thermal expansion of the shaft is decreased. If the amount of mica exceeds 60 wt %, it becomes difficult to disperse it homogenously in a slurry. As a result, there is a concern that physical properties of the base material for a disk may vary widely.

The base material of the invention may contain an agglomeration aid and an organic binder in addition to the above-mentioned components within a range that the advantageous effects of the invention are not impaired.

As the organic binder, organic fibers (pulp) and starch are preferable. If organic fibers (pulp) are contained, compression properties can be developed. The amount thereof may be 2 to 10 wt % or 5 to 10 wt %, for example. If starch is contained, the strength of a disk material can be exhibited. The amount thereof may be 1 to 10 wt % or 1 to 4 wt %, for example.

The base material of the invention may contain, as inorganic components, ceramic fibers, kibushi clay, bentonite and mica in a total amount of 85 wt % or more, 90 wt % or more, 95 wt % or more, 98 wt % or more, 99 wt % or more and 100 wt %.

In the base material of the invention, due to the presence of the above-mentioned components within the above-mentioned range, it is possible to obtain a disk roll having heat resistance, strength and hardness in a well-balanced manner even if the amount of the inorganic fibers is small.

The base material can be produced by forming an aqueous slurry that contains inorganic fibers, kibushi clay, bentonite and mica in a plate-like shape, followed by drying. At this time, it is preferable to use a paper-making method in respect of efficiency. Specifically, an aqueous slurry containing inorganic fibers, kibushi clay, bentonite, mica, an agglomeration aid, an organic binder or the like (if necessary) in a predetermined amount is prepared, the aqueous slurry is formed into a plate by a paper-making machine, followed by drying, whereby the base material can be obtained. The thickness of the base material can be set appropriately. The thickness is normally 2 to 10 mm.

Next, an explanation will be made on the method for producing a disk roll. Normally, ring-like disk materials are punched out from the base material. A plurality of disk materials are fitted by insertion to a metal (for example, iron) shaft, whereby a roll-like laminate is obtained. The entire roll-like laminate is compressed from the both ends thereof through a flange provided at the both ends, and fixed by means of a nut or the like in the state where the disk materials are slightly compressed. The laminate is fired, if necessary. By grinding the outer peripheral surface of the disk materials such that a desired roll diameter can be obtained, a disk roll can be obtained.

As for the shape of a disk roll, a full cover roll, a cantilever roll, a stub roll or the like can be mentioned.

For example, as shown in FIG. 1, a glass melt 100 is conveyed while being disposed between disk rolls 10 of the invention. The glass melt 100 is cooled and hardened, whereby glass can be produced.

EXAMPLES

Example 1

Preparation and Evaluation of a Base Material for a Disk Roll

An aqueous slurry comprising 7 wt % of ceramic fibers (alumina: 40 to 60 wt %, silica: 60 to 40 wt %), 30 wt % of kibushi clay, 10 wt % of bentonite, 45 wt % of white mica, 6 wt % of pulp and 2 wt % of starch was prepared. A sheet (a base material for a disk roll) was prepared by a paper-making method.

For the resulting base material, measurement or evaluation of the properties was conducted by the following method. The results are shown in Table 1.

(1) Water Filterability

Evaluation was conducted in terms of water filtering time by means of a TAPPI hand-made paper-making machine.

○: Shorter than 100 seconds Δ: 100 to 200 seconds x: Longer than 200 seconds

(2) Appearance of a Sheet o: Excellent Δ: Uneven x: Cracked

(3) Heat Shrinkage

The base material for a disk roll was cut into a width of 30 mm and a length of 150 mm. The base material was heated at 900° C. for 3 hours, and thereafter, the length in the line direction and the length in the thickness direction were measured. Heat shrinkage was evaluated based on the following formula:

[(Measurement value before heating−Measurement value after heating)/Measurement value before heating]×100

(4) Bending Strength Test of an Original Plate (Bending Strength and Bending Modulus of Elasticity)

After retaining the base material for a disk roll in a heating furnace kept at 900° C. for 3 hours, the base material was naturally cooled to room temperature. From the base material before heating and from the base material after cooling, a test specimen having a width of 30 mm and a length of 150 mm was cut out, respectively. By using an "Autograph AG-100 kND" manufactured by Shimadzu Corporation, the bending strength and the flexural modulus of elasticity were evaluated in accordance with JIS K7171.

(5) Spalling Resistance

From the base material for a disk roll, a disk material having an outer diameter of 60 mm and an inner diameter of 20 mm was punched out. The disk materials were assembled into a 20 mm-diameter stainless-made shaft in the form of a roll such that the length of the roll became 100 mm and the packing density of the roll became values shown in Table 1, whereby a disk roll was prepared.

This disk roll was put in an electric furnace kept at 900° C. After the lapse of 15 hours, the disk roll was taken out and quenched to room temperature (25° C.). This cycle of heating and quenching was repeated until cracks were formed or disk separation occurred in the disk roll, and the number of cycles when cracks were formed or disk separation occurred was counted.

In addition, the Shore D hardness of the disk material before the spalling resistance test and the hardness of the disk material after cracks were formed or disk separation occurred (after the test) were respectively evaluated.

(6) Amount of Load Deformation

From the base material for a disk roll, a disk material having an outer diameter of 60 mm and an inner diameter of 20 mm was punched out. The disk materials were assembled to a 20 mm-diameter stainless-made shaft in the form of a roll such that the length of the roll became 100 mm and the packing density of the roll became values shown in Table 1, whereby a disk roll was prepared.

As for the thus obtained disk roll, the both ends of the shaft were supported by a supporting stand, whereby a load of 10 kgf/cm was applied by means of a compressing element to the roll surface made of disk materials at 1 mm/min, and an amount of load deformation (room temperature) at that time was measured.

As for the disk roll obtained by retaining in a heating furnace at 900° C. for 10 hours, taking out from the heating furnace, and cooling to room temperature, the amount of load deformation (900° C., 10 hours) was measured in the same manner as mentioned above.

Referential Example 1

A base material and a disk roll were produced and evaluated in the same manner as in Example 1, except that an aqueous slurry comprising 30 wt % of ceramic fibers (alumina: 50 wt %, silica: 50 wt %), 20 wt % of kibushi clay, 10 wt % of bentonite, 32 wt % of white mica, 6 wt % of pulp and 2 wt % of starch was used. The results are shown in Table 1.

TABLE 1

| | | | Example 1 | Referential Example 1 |
|---|---|---|---|---|
| Composition | Ceramic fibers | % | 7 | 30 |
| | White mica | % | 45 | 32 |
| | Kibushi clay | % | 30 | 20 |
| | Bentonite | % | 10 | 10 |
| | Pulp | % | 6 | 6 |
| | Starch | % | 2 | 9 |
| Plate making properties | Water filterability | Water filtering time (sec) | 60 | 30 |
| | | Evaluation | ○ | ○ |
| | Appearance of sheet | Evaluation | ○ | ○ |
| Physical properties of sheet | Density of original sheet | g/cm³ | 1.00 | 0.7 |
| | Heat shrinkage (%) 900° C. × 3 hr | Line direction | −0.51 | 0.2 |
| | | Thickness direction | 0.96 | 1.6 |
| | Bending strength (Mpa) 900° C. × 3 hr | Unheated | 10.76 | 4.7 |
| | | 900° C. | 6.34 | 2.8 |
| | Bending modulus of elasticity (Mpa) 900° C. × 3 hr | Unheated | 4072 | 1377 |
| | | 900° C. | 4373 | 1472 |
| Physical properties of roll | Standard density | g/cm³ | 1.4 | 1.25 |
| | Spalling resistance | Number of tests | 1 | 2 |
| | | Hardness before test | 56 | 50 |
| | | Hardness after test | 58 | 52 |
| | Amount of load deformation | Unheated | | 0.15 |
| | | 900° C. | 0.03 | 0.11 |

From the results of Table 1, it can be understood that the disk roll of Example 1 had practically satisfactory heat resistance and strength that are equivalent to these of Referential Example 1 in spite of a small fiber amount.

INDUSTRIAL APPLICABILITY

The disk roll of the invention can be used in production of plate glass, in particular for the production of a liquid crystal display, a plasma display and an organic EL display.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification of a Japanese application on the basis of which the present application claims Paris convention priority are incorporated herein by reference in its entirety.

The invention claimed is:

1. A base material for a disk roll, the base material comprising:
    5 to 9 wt % of ceramic fibers, 20 to 40 wt % of kibushi clay, 2 to 20 wt % of bentonite and 40 to 60 wt % of mica,
    wherein the amount of shots having a diameter of 45 μm or more in the ceramic fibers is 5 wt % or less.

2. The base material for a disk roll according to claim 1, wherein the ceramic fibers comprise 30 wt % or more and less than 70 wt % of alumina and more than 30 wt % and 70 wt % or less of silica.

3. The base material for a disk roll according to claim 1, which further comprises pulp and starch.

4. A method for producing a base material for a disk roll, the method comprising:
    providing ceramic fibers comprising 30 wt % or more and less than 70 wt % of alumina, more than 30 wt % and 70 wt % or less of silica, and 5 wt % or less of shots having a diameter of 45 μm or more;
    mixing water, the ceramic fibers, kibushi clay, bentonite and mica to produce an aqueous slurry comprising, in solid content, 5 to 9 wt % of the ceramic fibers, 20 to 40 wt % of the kibushi clay, 2 to 20 wt % of the bentonite, and 40 to 60 wt % of the mica; and
    flowing the aqueous slurry in a forming chamber or a forming mold, followed by water filtration to produce a sheet.

5. A disk roll which comprises ring-like disk materials obtained from the base material according to claim 1.

6. A method for producing a disk roll, the method comprising:
    providing a base material according to claim 1;
    punching out a plurality of ring-like disk materials from the base material according to claim 1; and
    fitting by insertion the plurality of ring-like disk materials into a shaft, followed by compression to obtain a roll-like laminate.

7. A method for producing glass comprising conveying a glass melt by means of the disk roll according to claim 5, and cooling the glass melt.

8. The base material for a disk roll according to claim 2, which further comprises pulp and starch.

9. The base material for a disk roll according to claim 1, which further comprises pulp and starch.

10. The base material for a disk roll according to claim 2, which further comprises pulp and starch.

11. A disk material for a disk roll, the disk material comprising:
    5 to 9 wt % of ceramic fibers, 20 to 40 wt % of kibushi clay, 2 to 20 wt % of bentonite and 40 to 60 wt % of mica,
    wherein the amount of shots having a diameter of 45 μm or more in the ceramic fibers is 5 wt % or less.

12. A method for producing a disk material for a disk roll, the method comprising:
    providing a base material according to claim 1; and
    punching out a ring-like disk material from the base material according to claim 1.

13. The base material for a disk roll according to claim 1, wherein the base material comprises 6 to 8 wt % of the ceramic fibers, 28 to 38 wt % of the kibushi clay, 5 to 14 wt % of the bentonite, and 40 to 54 wt % of the mica, and
    wherein a total amount of the ceramic fibers, kibushi clay, bentonite and mica is 90 wt % or more.

14. The base material for a disk roll according to claim 1, wherein the base material comprises 6 to 8 wt % of the ceramic fibers, 28 to 38 wt % of the kibushi clay, 5 to 14 wt % of the bentonite, 40 to 54 wt % of the mica, 2 to 10 wt % of pulp, and 1 to 10 wt % of starch, and
    wherein a total amount of the ceramic fibers, kibushi clay, bentonite and mica is 90 wt % or more.

15. The base material for a disk roll according to claim 1, wherein the base material comprises 6 to 8 wt % of the ceramic fibers, 28 to 38 wt % of the kibushi clay, 5 to 14 wt % of the bentonite, 44 to 54 wt % of the mica, 2 to 10 wt % of pulp, and 1 to 10 wt % of starch, and
    wherein a total amount of the ceramic fibers, kibushi clay, bentonite and mica is 90 wt % or more.

16. The base material for a disk roll according to claim 1, wherein the base material comprises 6 to 8 wt % of the ceramic fibers, 28 to 38 wt % of the kibushi clay, 5 to 14 wt % of the bentonite, 44 to 54 wt % of the mica, 5 to 10 wt % of pulp, and 1 to 4 wt % of starch, and
    wherein a total amount of the ceramic fibers, kibushi clay, bentonite and mica is 90 wt % or more.

17. The base material for a disk roll according to claim 2, wherein the base material comprises 6 to 8 wt % of the ceramic fibers, 28 to 38 wt % of the kibushi clay, 5 to 14 wt % of the bentonite, and 40 to 54 wt % of the mica, and
    wherein a total amount of the ceramic fibers, kibushi clay, bentonite and mica is 90 wt % or more.

18. The base material for a disk roll according to claim 2, wherein the base material comprises 6 to 8 wt % of the ceramic fibers, 28 to 38 wt % of the kibushi clay, 5 to 14 wt % of the bentonite, 44 to 54 wt % of the mica, 5 to 10 wt % of pulp, and 1 to 4 wt % of starch, and
    wherein a total amount of the ceramic fibers, kibushi clay, bentonite and mica is 90 wt % or more.

* * * * *